United States Patent
Cheng et al.

(10) Patent No.: US 10,409,866 B1
(45) Date of Patent: Sep. 10, 2019

(54) SYSTEMS AND METHODS FOR OCCUPATION NORMALIZATION AT A JOB AGGREGATOR

(71) Applicant: Glassdoor, Inc., Mill Valley, CA (US)

(72) Inventors: Lingfeng Cheng, Burlingame, CA (US); Alan Warren Wilson, Corte Madera, CA (US); Vikas Sabnani, Oakland, CA (US); Amanda Nichole Baker, Redwood City, CA (US)

(73) Assignee: GLASSDOOR, INC., Mill Valley, CA (US)

( * ) Notice: Subject to any disclaimer, the term of this patent is extended or adjusted under 35 U.S.C. 154(b) by 399 days.

(21) Appl. No.: 15/195,523

(22) Filed: Jun. 28, 2016

(51) Int. Cl.
*G06F 17/30* (2006.01)
*G06F 16/951* (2019.01)
*G06N 20/00* (2019.01)

(52) U.S. Cl.
CPC .......... *G06F 16/951* (2019.01); *G06N 20/00* (2019.01)

(58) Field of Classification Search
CPC .............................................. G06F 17/30424
See application file for complete search history.

(56) References Cited

U.S. PATENT DOCUMENTS

| 9,639,827 B1* | 5/2017 | Li ..................... G06Q 10/1053 |
| 2016/0132830 A1* | 5/2016 | Zhang ................ G06Q 10/105 |
| | | 705/320 |
| 2017/0242909 A1* | 8/2017 | Kenthapadi ....... G06F 17/30601 |

* cited by examiner

*Primary Examiner* — Hung Q Pham
(74) *Attorney, Agent, or Firm* — Womble Bond Dickinson (US) LLP (57) ABSTRACT

A method and apparatus for generating normalized occupations for job titles at a job aggregation system is described. The method may include receiving a job title having a plurality of words that make up the job title, the job title received as part of a request of a job aggregation system to perform a service. The method may also include translating the plurality of words into standardized terms of the job aggregation system to generate a translated job title. Furthermore, the method may include mapping the translated job title to one of a plurality of normalized occupations of the job aggregation system by a machine learning based classifier of the translated job title, wherein the machine learning based classifier is trained based on user search behavior of users that have searched for jobs at the job aggregation system.

18 Claims, 6 Drawing Sheets

SYSTEMS AND METHODS FOR OCCUPATION NORMALIZATION AT A JOB AGGREGATOR

TECHNICAL FIELD

Embodiments of the invention relate to the field of data management, and more particularly, to generating and using normalized occupations at a job aggregation system.

BACKGROUND

The internet provides a convenient way to disseminate information to a large amount of people. One popular usage of disseminating information via the internet is through listings of employment opportunities provided on job listing web pages. For example, companies will frequently have one or more job listings pages on their websites that list open positions, qualifications for specific positions, job and skills descriptions, location, etc. This information can be provided to, or collected by, job listing aggregators that provide listings of jobs to users in a comprehensive listing. Continuing the example, the job listing aggregator could show similar jobs (e.g., software engineering positions) from different companies in the same listing, sort the listing based on user supplied criteria, provide employee reviews of employers along with the listings, etc.

Job aggregators interact with many different entities when collecting and listing jobs. Because these different entities may have innumerable ways of referring to similar jobs, the collection, categorization, and analysis of the collected job listings becomes problematic. For example, a first job listing could refer to a Software Engineer, a second job listing could refer to a Sr. Developer in Java, and a third job listing could refer to a Software Ninja in Web Interfaces. Although these job listings may be for very similar jobs, their titles do not provide a convenient way of indexing the jobs listings, searching based on job title, gathering statistics for the listings based on job title, etc.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

In the following description, numerous details are set forth. It will be apparent, however, to one of ordinary skill in the art having the benefit of this disclosure, that the present invention may be practiced without these specific details. In some instances, well-known structures and devices are shown in block diagram form, rather than in detail, in order to avoid obscuring the present invention.

Embodiments of methods and systems for generating normalized occupations from any job title by a job aggregator, and using the normalized occupations, are described. In one embodiment, static listings are initially created for translating components of job titles (e.g., words) to standardized versions of those components (e.g., standardized terms). For example, two job titles may refer to a Sr. Software Engineer and Senior Software Engineer. The static lists could map Sr. and Senior to a standardized term of Senior, similarly other components, such as an occupation component, a seniority component, a modifier component, etc. could be mapped/translated to standardized terms to convert words from any job titles to corresponding standardized terms.

In one embodiment, after standardizing the terms used in a job title, the standardized terms for the job title are stripped into a plurality of component parts, and based on a machine learning based training of a classifier, the classifier converts the component parts to a normalized occupation (e.g., a normalized version of the original job title). In one embodiment, the machine learning based training of the classifier utilizes user search behavior at the job aggregator as a source for building relationships and strengths between the standardized terms and the normalized occupations. The normalized versions of job titles in job listings enables simpler and more accurate job collection, job searches, statistical analysis of job listings, etc. That is, for example, job listings for a Patent Attorney and a Technology Lawyer in Patents, although having different titles, could be treated the same for indexing by a job aggregator, collection and storage by the job aggregator, for converting a user entered job title in a search to a normalized form for improving search results, for providing better statistics, such as salary estimates, by more accurately collecting the same jobs together or analyzing a larger corpus of data, etc.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving", "translating", "mapping", "performing", "stripping", "removing", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

Figure 1:
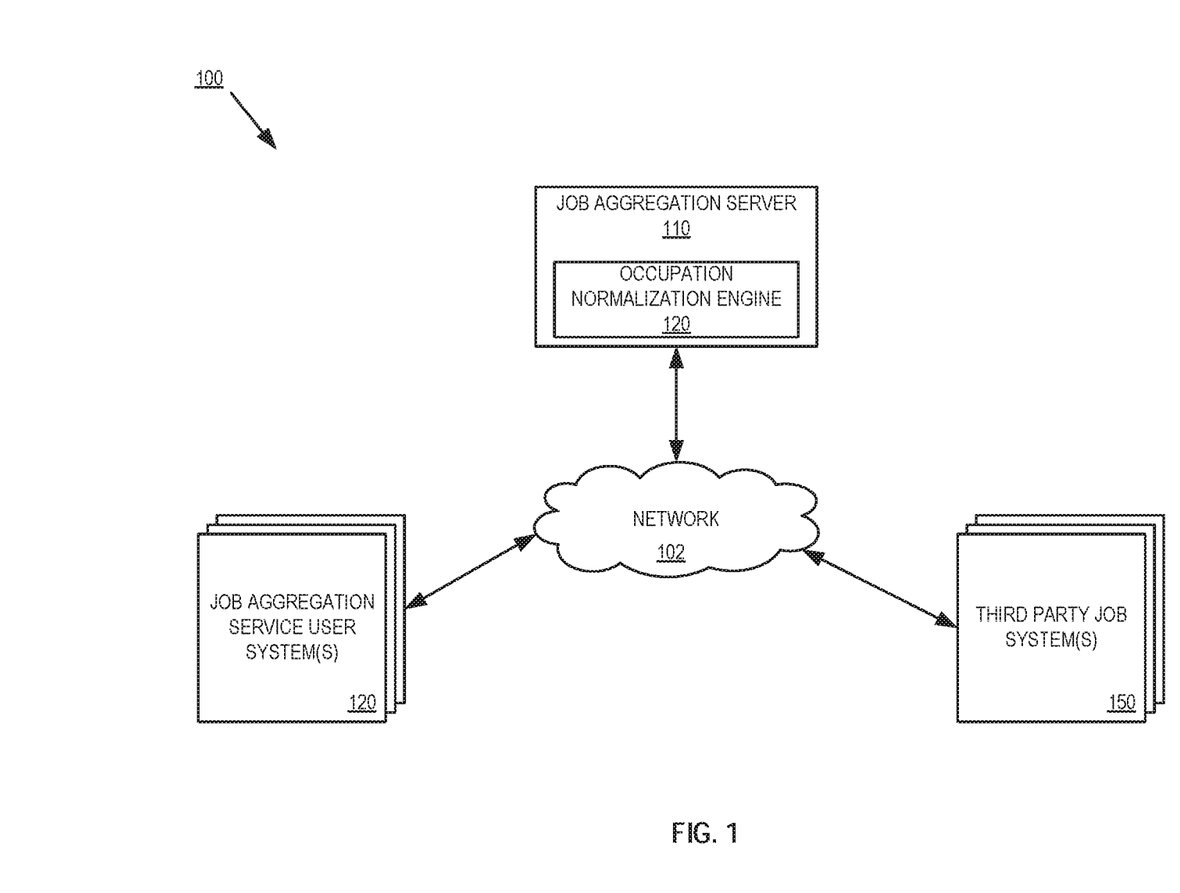
FIG. 1 is a block diagram of an exemplary system architecture for generating normalized occupations for any job title in a job listing at a job aggregation server.

FIG. 1 is a block diagram of an exemplary system architecture 100 for generating normalized occupations for any job title in a job listing at a job aggregation server.

In one embodiment, the system 100 includes a job aggregation server 110, a plurality of job aggregation service user systems 120, and one or more third party job system(s) 150. In one embodiment, job aggregation server 110 and third party job system(s) 150 are executed on computing devices, such as one or more server computers, desktop computers, etc. User systems 120 are also executed on a computing device, such as a smartphone, tablet computer, laptop computer, desktop computer, or other computing device.

The job aggregation server 110, user systems 120, and third party job system(s) 150 may be coupled to a network 102 and communicate with one another using any of the standard protocols for the exchange of information. In one embodiment, one or more of the job aggregation server 110, user systems 120, and third party job system(s) 150 are communicatively coupled via one Local Area Network (LAN) and may be incorporated into the same physical or logical system, or different physical or logical systems. Alternatively, the job aggregation server 110, user systems 120, and third party job system(s) 150 may be communicatively coupled via different LANs, wide area networks, cellular telephone networks, etc. that may be coupled together via the Internet but separated by firewalls, routers, and/or other network devices. It should be noted that various other network configurations can be used including, for example, hosted configurations, distributed configurations, centralized configurations, etc.

In one embodiment, job aggregation server 110 collects job listings from job websites provided by third party job system(s) 150, which are a set of web pages that provide listings of job descriptions for various jobs of different entities. For example, a first job website may provide a listing of job descriptions for a first company, a second job website may provide another listing of job descriptions for a second company, and a third job website may provide a collection of listings for one or more companies. In one embodiment, job aggregation server 110 may also collect job listings provided to job aggregation server 110 by employers, recruiters, user systems(s) 120, etc. offering job listings to potential employees through job aggregation server 110. Although the different sources of job listings may provide job opportunities for the same and/or similar jobs, the job titles used by each entity is likely to be different.

In embodiments discussed herein, job aggregation server 110 utilizes occupation normalization engine 120 to convert a job title from any job listing into one of a plurality of normalized occupations, which are normalized versions of job titles. For example, job listings for Sr. Software Developer and Senior SW Engineer can both be converted into their normalized versions of, for example, senior software engineer. By conversion of the terms of the job listings into normalized versions of the job listings, the job aggregation server 110 condenses the innumerable variations of job titles into a meaningful and condensed set, such as several thousand normalized occupations. The condensed set enables job listings to be more accurately gathered, organized, indexed, analyzed, etc. regardless of the different job titles used in the original job listings.

In one embodiment, for any new job listing having a job title, and/or job search by job title, input into job aggregation server 110, such as by any of user system(s) 120, third party job system(s) 150, crawled by job aggregation server 110, etc., occupation normalization engine 120 of job aggregation server 110 accesses the job title and translates the words making up the job title into standardized or canonical terms. In one embodiment, the translation is performed using one or more static listings that map job title terms to a standardized version of those terms (e.g., Sr. translated to senior, R.N. translated to registered nurse, etc.). In one embodiment, the static listings are pre-generated, such as by a developer of job aggregation server 110 or a machine learning model, so that different terminology having the same meaning are translated to the same term by occupation normalization engine 120, and may be periodically revised to capture new terms, abbreviations, current usage, etc. In one embodiment, a plurality of static listings corresponding to occupations, seniority, and modifiers are individually maintained by occupation normalization engine 120. In one embodiment, irrelevant or meaningless data that does not add to an understanding of a job title may be removed from a job title during translation, such as punctuation, prepositions, adverbs, etc. (E.g., "Sr. SW Engineer, Manager" could be converted to the standardized terms of senior software engineer manager).

After translation of a job title, occupation normalization engine 120 strips the job title into component parts. In one embodiment, the static listings, which are themselves organized by component part, can be used to separate the standardized terms into the listing's various component parts. Continuing the example above, the standardized terms senior software engineer manager could be stripped to the component parts: occupation=software engineer, seniority=senior, and modifier=manager. The combination of component parts, including occupation, seniority, and modifier, are used by occupation normalization engine 120 to describe any job title. Although a job title could be divided into occupation, seniority, and modifier as the component parts, the description herein should not be limited to only these component parts, as any number of component parts may be used by occupation normalization engine 120 consistent with the discussion herein.

In one embodiment, occupation normalization engine 120 then maps the stripped components to one of a plurality of normalized occupations. In one embodiment, the normalized occupations are a condensed set of occupations determined by analysis of the corpus of job title content on job aggregation server 110. For example, analysis of job listings, user reviews of their jobs (including their job titles), salary submissions for a job including a job title, etc. available to job aggregation server 110 are used to choose a set of popular, widely, and/or consistently used job titles as the normalized occupations. Furthermore, other sources of information, such as supplemental titles provided by the Bureau of Labor and Statistics (BLS) can provide additional job titles. Use of the supplement sources of information ensures that the set of normalized occupations is a full and representative set of potential job titles.

In one embodiment, as discussed in greater detail below, the occupation normalization engine 120 maps the stripped components to one of a plurality of normalized occupations using a machine learning trained classifier. The classifier enables occupation normalization engine 120 to determine a strength between each standardized term in the stripped component parts to each potential normalized occupation, sum the component part strengths for each normalized occupation, and select the normalized occupation having the greatest sum. Furthermore, to ensure that the classifier is trained accurately, as discussed in greater detail below, user search behavior is collected as data indicative of links between user clicked job titles and normalized occupations. Then, the collected links, or associations between standardized terms and normalized occupations, are analyzed by a machine learning model to train the classifier of occupation normalization engine 120.

After the job title, which as discussed herein may be received as part of a user job search, received in a user request for salary information, may be part of a job listing uploaded by a third party job system 150, may be collected during a job crawl by job aggregation server 110, etc., is converted to a normalized occupation, the normalized occupation may be added by job aggregation server 110 to a record for the new job listing to enable improved statistical analysis, job sorting, job indexing, etc., by performing these functions on the normalized occupation and not on individualized and variable job titles. Furthermore, job queries entered by users may be improved when the user searched job title is first converted to a normalized occupation before gathering statistical analysis for jobs matching the normalized occupation, for returning search results including jobs matching the normalized occupation, etc.

Figure 2:
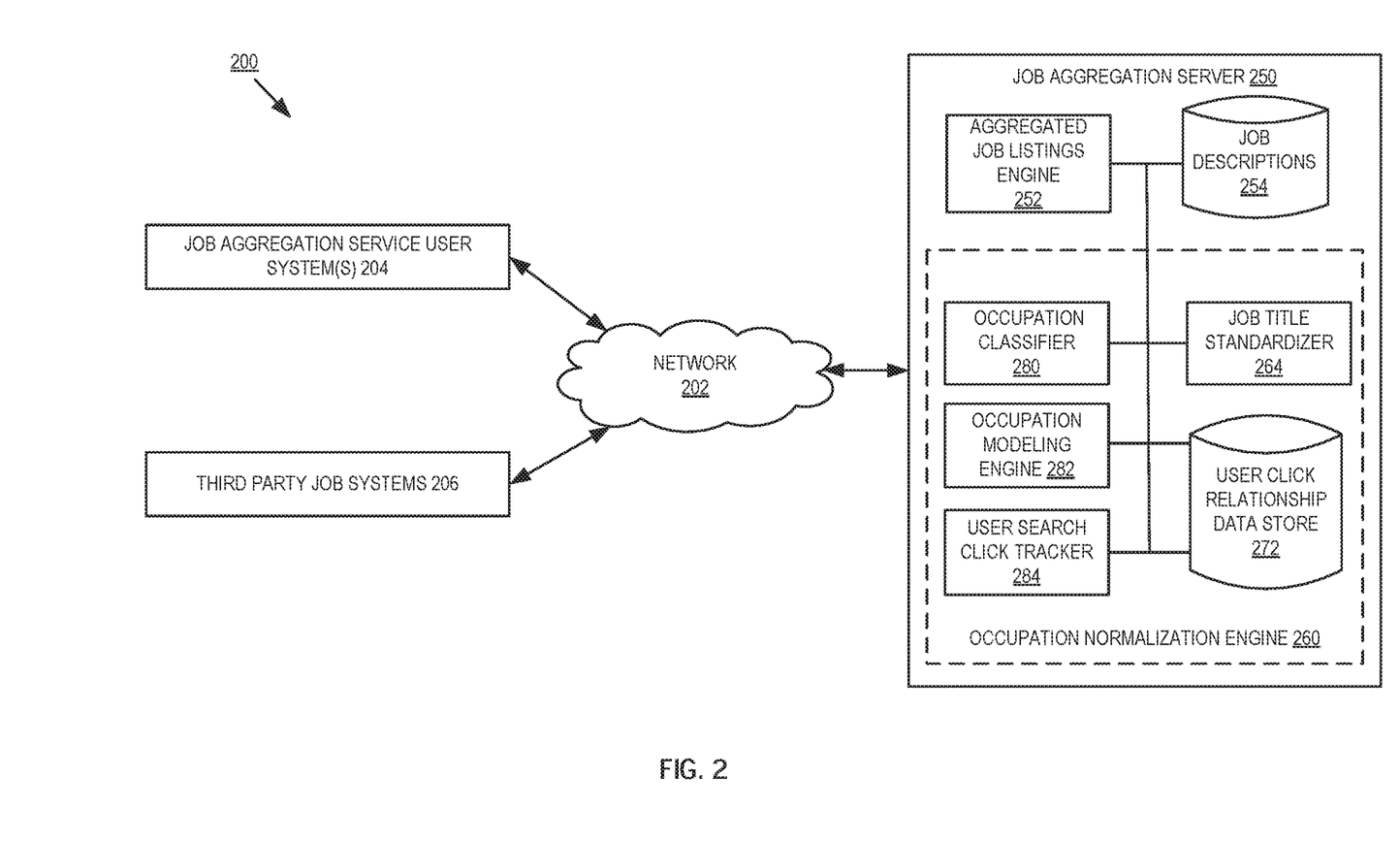
FIG. 2 is a block diagram of one embodiment of a job aggregation server including an occupation normalization engine for generating normalized occupations for job titles in job listings.

FIG. 2 is a block diagram of one embodiment 200 of a job aggregation server 250 with an occupation normalization engine 260. Job aggregation server 250 and occupation normalization engine 260 provide additional details for the job aggregation server and occupation normalization engine discussed above in FIG. 1. In embodiments, occupation normalization engine 260 may reside on job aggregation server 250. However, in other embodiments, occupation normalization engine 260 may reside on a different server computer system communicably coupled with job aggregation server 250 over network 202.

In one embodiment, job aggregation server 250 includes an aggregated job listings engine 252 coupled with a job descriptions database 254. The aggregated job listings engine 252 accesses job descriptions database 254 to provide a web page based listing of job descriptions collected from one or more job websites of third party job system 206 to user devices (e.g., user computer system(s) 204). In one embodiment, job listing engine 252 provides job descriptions of different jobs retrieved using normalized occupations generated for those job listings, provides job salary statistics generated from jobs having the same normalized occupations, etc. Therefore, job listing engine 252 accesses occupation normalization engine 260 to convert received job titles (e.g., from user searches, user requests, as part of job listing uploads to job descriptions database 254, etc.) to normalized occupations.

As discussed above, because job listings and/or job titles provided by different third party job systems 206, by user system(s) 204, gathered by job aggregation server 250, etc. may refer to the same jobs using different titles, occupation normalization engine 260 is responsible for generating a normalized occupation for any job title received or submitted to job aggregation server 250. Occupation normalization engine 260 generates the normalized occupations from job titles using job title standardizer 264, user search click tracker 284, occupation classifier 280, and occupation modeling engine 282.

In embodiments, whenever a job title is received by job aggregation server 260, job title standardizer 264 is responsible for translating the terms used in the job title to standardized versions of those terms. In one embodiment, job title standardizer 264 parses a job title to match terms in the job title to those found in a plurality of static lists. In embodiments, each static list is pregenerated with mappings from potential job title terms to standardized terms (e.g., Sr.→senior, R.N.→registered nurse, SW→software, etc.). When a match is found, the terms from the original job title are translated to the associated standardized terms. In one embodiment, job title standardizer also removes irrelevant content from the title, such as punctuation, adverbs, prepositions, capitalization, etc.

In one embodiment, occupation normalization engine 260 utilizes the user search click tracker 284 to gather actual user search behaviors of users interacting with job aggregation server 250. In one embodiment, a job title search for job listings of job aggregation server 250 are detected by user search click tracker 284. The job title is standardized by job title standardizer 264 as discussed above. Aggregated job listings engine 252 utilizes the user entered search terms to search an index of job listings for jobs stored in job descriptions database 254, and returns an ordered listing of likely relevant job listings. When a user selects a job listing from the returned search results, user search click tracker 284 captures the association between the standardized terms of the job title for the search and the search term that the user entered, as well as other information relevant to an association between the original job title search and a selected job listing, such as position of the selected listing on a page, the normalized job title for the selected listing, etc., which is stored in user click relationship data store 272. In one embodiment, the user search terms are assumed to use good and direct terminology (e.g., reflect actual/real job titles), and thus the link between the standardized version of the user search terms and a normalized occupation, as well as the other associations, for a selected search result is considered a good indication that the standardized job title and the normalized occupation have at least some relationship to one another. Furthermore, the additional association data supplements this relationship data, such as what position the selected search result appeared in the listing of search results, what surface the user conducted the search on (e.g., desktop, email, or mobile device) and the type of click (e.g., click on an impression of a job listing or a click to apply to the job), etc. Therefore, in embodiments, actual user search behavior, collected from a plurality of searches performed by different user systems 204, builds relationship data between standardized versions of job titles and normalized occupations.

In one embodiment, occupation modeling engine 282 is responsible for analyzing the user click relationship data store 272 to train the occupation classifier 280. In one embodiment, occupation modeling engine 282 builds a relationship graph from the relationships stored in user click relationship data store 272. More specifically, occupation modeling engine 282 builds the graph by creating a relationship between each word of a standardized job title of a user entered search and the normalized occupation associated with the selected search result (including any additional modifier data to the relationship, such as selected first result). Occupation modeling engine then applies a machine learning analysis, such as a Naive Bayes Modeling, Random Forest Modeling, Deep Learning/Neural Net Modeling, etc., to the collected relationships between standardized job title terms and normalized occupations to model the strength of relationships between individual standardized terms and each normalized occupation. After modeling, the occupation classifier 280 can be used by occupation normalization engine 260 to convert any job title to a normalized occupation as discussed herein.

In one embodiment, a job title may be provided to occupation normalization engine 260 (e.g., as a result of user search, a new job listing being uploaded to job aggregator, crawled job listings being pulled into job aggregator, etc.). The job title is translated to standardized terms and irrelevant content is removed by job title standardizer 264, as discussed above. Once the job title is translated into standardized terminology, the standardized job title is further divided into component parts by job title standardizer 264. In one embodiment, the component parts of the job title are occupation, seniority, and modifier(s), and the component parts may be determined using the same static listings used to map the original job title terms to the standardized terms.

The component parts of the job title in the standardized terms are then analyzed by occupation classifier 280. In one embodiment, the machine learning based model having relationship strengths between standardized terms and different normalized occupations is used to score the relationships between the standardized component part terms with each normalized occupation (e.g., summing the strength of each component part to a normalized occupation). Then, the occupation classifier 280 selects the highest sum as the best match with the normalized occupation, and sets the normalized occupation for the received job title (e.g., sets a normalized occupation for a user search or information request, job title in an uploaded job, job title in a crawled job, etc.).

Figure 3:
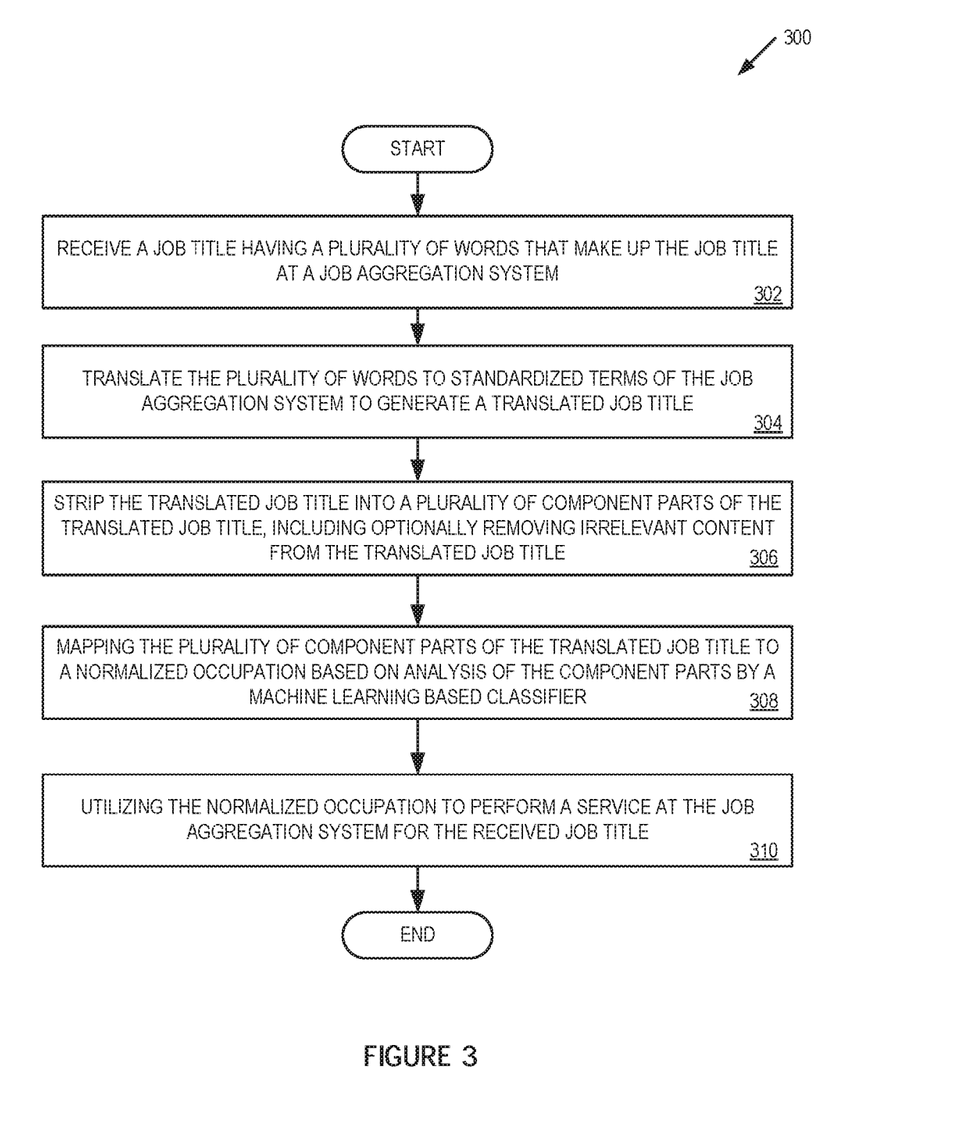
FIG. 3 is a flow diagram of one embodiment of a method for generating and using normalized occupations for job titles.

FIG. 3 is a flow diagram of one embodiment of a method 300 for generating and using normalized occupations for job titles. The method 300 is performed by processing logic that may comprise hardware (circuitry, dedicated logic, etc.), software (such as is run on a general purpose computer system or a dedicated machine), firmware, or a combination. In one embodiment, the method 300 is performed a job aggregation server 250.

Referring to FIG. 3, processing logic begins by receiving a job title having a plurality of words that make up the job title at a job aggregation system (processing block 302). As discussed herein, the job title may be received as part of a user query for job listings by job title, as part of a request to gather statistics for a job title (e.g., job openings for similar job titles within the same occupation), as part of a new job listing uploaded from a third party, as part of a new job listing imported during a website crawl by a job aggregator, etc. The words that make the up the job title are specific to the user or entity that created the title, and would therefore be different across different users, job providers, job websites, etc. for the same and/or similar jobs.

Processing logic translates the plurality of words to standardized terms of the job aggregation system to generate a translated job title (processing block 304). In one embodiment, predefined static lists that map occupation, seniority, and modifier terms, as well as other component parts, to standardized versions of those terms are used by processing logic to perform the translation. Processing logic then strips the translated job title into the component parts of the translated job title (processing block 306). Furthermore, some content from the job title, such as punctuation, adverbs, prepositions, capitalization, etc. can be removed when stripping the translated terms to their associated component parts by processing logic.

Processing logic maps the plurality of component parts of the translated job title to a normalized occupation based on analysis of the component parts by a machine learning based classifier (processing block 308). In embodiments discussed herein, the normalized occupations are a set of occupations predefined by the job aggregation system, which represent a condensed and meaningful collection of occupation titles. The set of normalized occupations may be generated based on internal analysis of job titles in job listings at job aggregation system, external job title compilations (e.g., BLS listings), etc. Furthermore, as discussed herein, the machine learning based classifier selects the normalized occupation for the original job title based on the strength of a relationship between the standardized and stripped terms of a job title with the set of normalized occupations, as discussed herein.

After the normalized occupation is selected, processing logic utilizes the normalized occupation to perform a service at the job aggregation system for the received job title (processing block 310). In embodiments, the service can include utilizing the selected normalized occupation to perform a job search for a user, associated an uploaded job listing with the correct normalized occupation (regardless of the job title), compute the number of job openings for all job titles with the same normalized occupation as the job title requested, etc.

Figure 4:
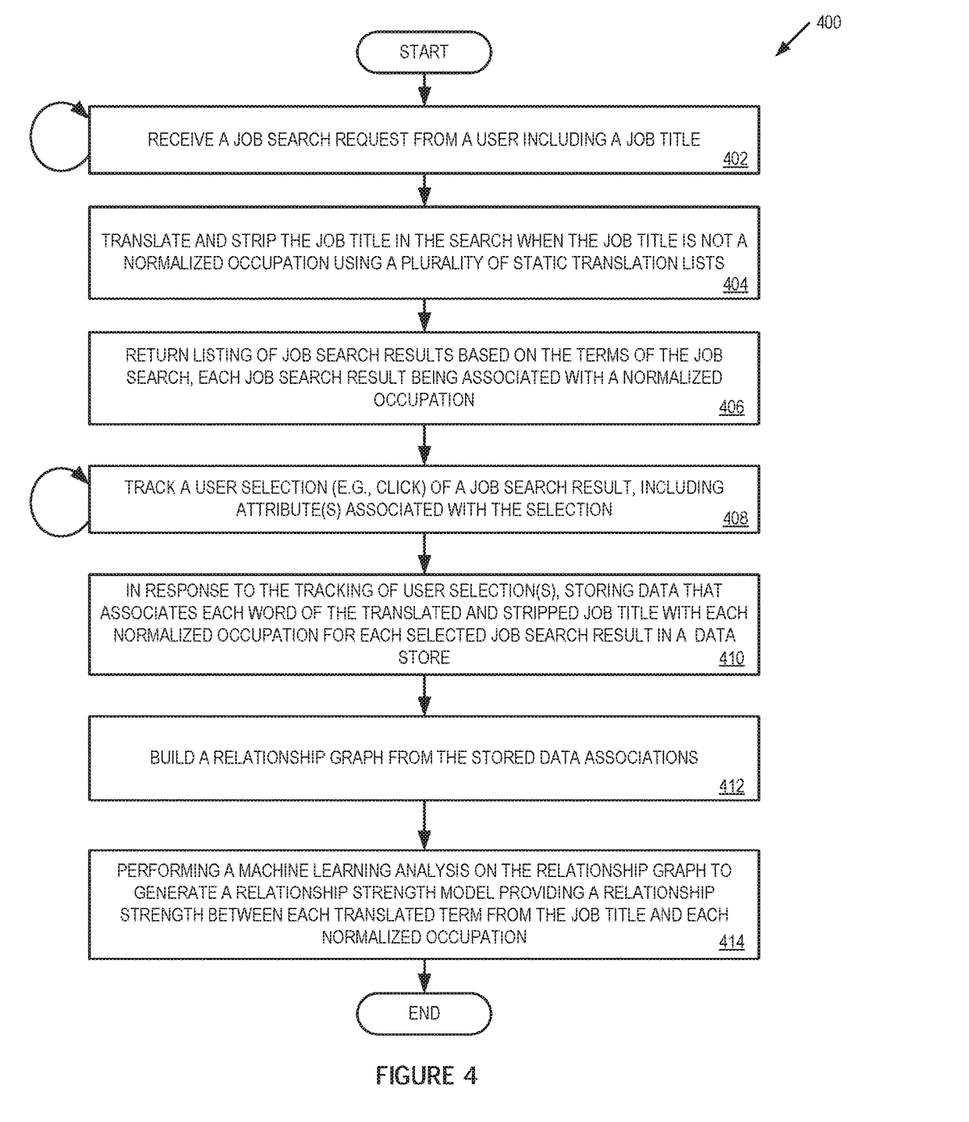
FIG. 4 is a flow diagram of one embodiment of a method for training a machine learning model based classifier that converts job titles to normalized occupations.

FIG. 4 is a flow diagram of one embodiment of a method 400 for training a machine learning model based classifier that converts job titles to normalized occupations. The method 400 is performed by processing logic that may comprise hardware (circuitry, dedicated logic, etc.), software (such as is run on a general purpose computer system or a dedicated machine), firmware, or a combination. In one embodiment, the method 400 is performed by occupation normalization engine 120 of 260.

Referring to FIG. 4, processing logic begins by receiving a job search request from a user including a job title (processing block 402). Processing logic translates and strips the job title in the search when the job title is not already a normalized occupation using a plurality of static translation lists (processing block 404). In one embodiment, when the received job title for the search request is already a normalized occupation (e.g., one of the condensed set of predefined occupations), it is merely stripped to component parts as no translation is needed. Processing logic then returns a listing of job search results based on the terms of the job search, each job search result being associated with a normalized occupation (processing block 406). In one embodiment, the listing of job search results is generated by processing logic using the original job title of the user's request to search against an index of job listings provided by a job aggregation system.

Processing logic tracks a user selection (e.g., clicks) of a job search result, including attribute(s) associated with the selection (processing block 408). In one embodiment, processing logic determines which job listing, and thus normalized occupation associated with the selected job search result, the user believes is related to their original search terms. This user search behavior is an indicator that the user entered job title is related to the normalized occupation associated with the selected result. Furthermore, data indicative of where the result appeared on the page, which surface was used and what the nature of user behavior was, etc. may be collected by processing logic as relationship modification data as processing logic continues to track the user behavior.

In response to the tracking of user selection(s), processing logic stores data that associates each word of the translated and stripped job title with each normalized occupation for each selected job search result in a data store (processing block 410). The stored data is indicative of relationships between each standardized term of the user inputted job title with normalized occupations based on the user's tracked search behaviors.

Processing logic builds a relationship graph from the stored data associations (processing block 412), and performs a machine learning analysis on the relationship graph to generate a relationship strength model providing a relationship strength between each translated term from the job title and each normalized occupation (processing block 414). As discussed in FIG. 5 below, the relationship strength model, also discussed herein as a classifier, enables any job title to be converted to one of the set of normalized occupations.

Figure 5:
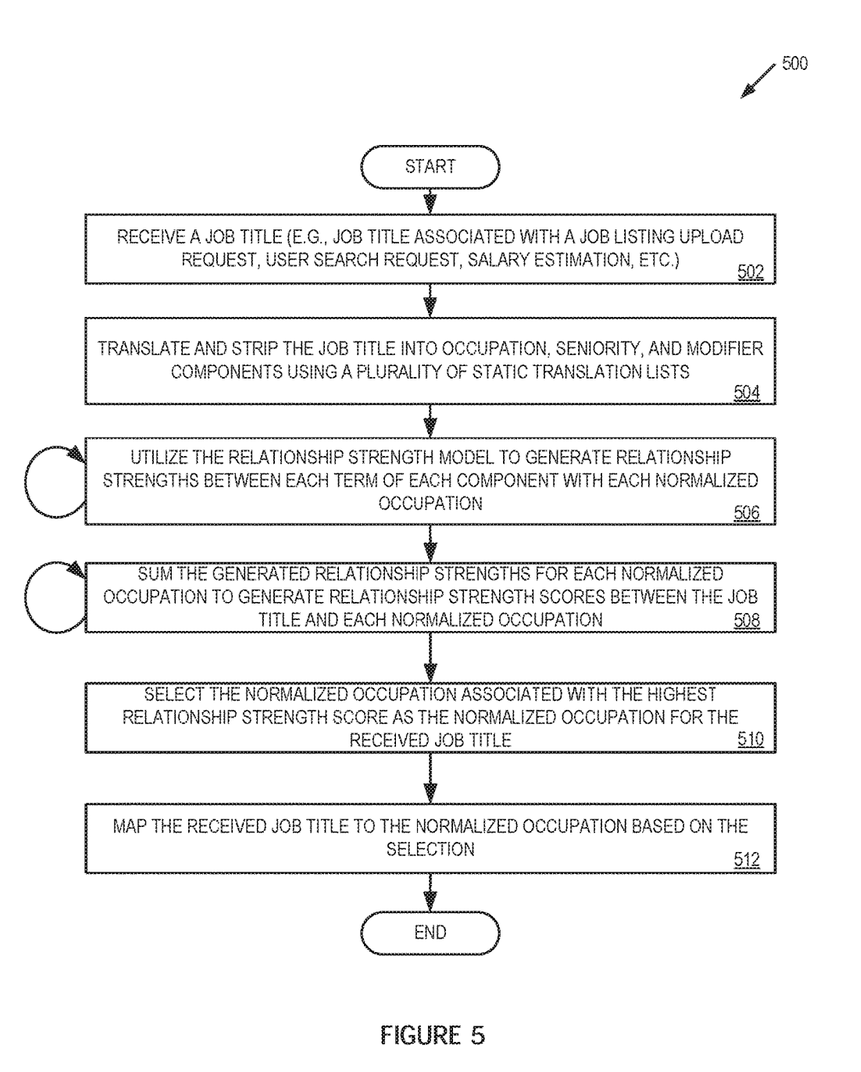
FIG. 5 is a flow diagram of one embodiment of a method for using the trained classifier to convert a job title to a normalized occupation.

FIG. 5 is a flow diagram of one embodiment of a method 500 for using a trained classifier to convert a job title to a normalized occupation. The method 500 is performed by processing logic that may comprise hardware (circuitry, dedicated logic, etc.), software (such as is run on a general purpose computer system or a dedicated machine), firmware, or a combination. In one embodiment, the method 500 is performed by occupation normalization engine 120 of 260.

Referring to FIG. 5, processing logic begins by receiving a job title (processing block 502). As discussed herein, the job title may be received as part of a job search request, a job upload operation, a job import operation, etc. Processing logic then translates and strips the job title into occupation, seniority, and modifier components using a plurality of static translation lists (processing block 504).

Processing logic utilizes the relationship strength model (e.g., classifier) to generate relationship strengths between each term of each component with each normalized occupation (processing block 506). Then, processing logic sums the generated relationship strengths for each normalized occupation to generate relationship strength scores between the job title and each normalized occupation (processing block 508). The normalized occupation associated with the highest relationship strength score is selected as the normalized occupation for the received job title (processing block 510), and the job title is mapped to the normalized occupation based on the selection (processing block 512). As discussed in embodiments herein, once the normalized occupation is selected, it can be used by a job aggregation system to improve the perform of various services, such as improving accuracy and efficiency of search results using the normalized occupation instead of a potentially unique user/system generated job title, improve a data sets for job title based statistical analysis, improve the storage and organization of a collection of job listings, etc.

Figure 6:
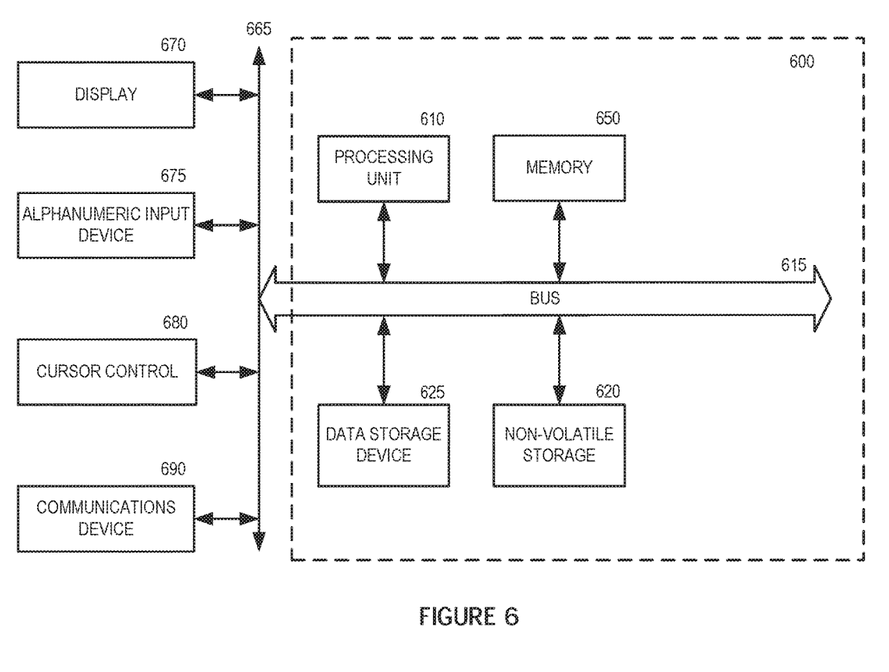
FIG. 6 is one embodiment of a computer system that may be used in accordance with an embodiment of the invention.

FIG. 6 is one embodiment of a computer system that may be used with the present invention. It will be apparent to those of ordinary skill in the art, however that other alternative systems of various system architectures may also be used.

The data processing system illustrated in FIG. 6 includes a bus or other internal communication means 615 for communicating information, and a processor 610 coupled to the bus 615 for processing information. The system further comprises a random access memory (RAM) or other volatile storage device 650 (referred to as memory), coupled to bus 615 for storing information and instructions to be executed by processor 610. Main memory 650 also may be used for storing temporary variables or other intermediate information during execution of instructions by processor 610. The system also comprises a read only memory (ROM) and/or static storage device 620 coupled to bus 615 for storing static information and instructions for processor 610, and a data storage device 625 such as a magnetic disk or optical disk and its corresponding disk drive. Data storage device 625 is coupled to bus 615 for storing information and instructions.

The system may further be coupled to a display device 670, such as a liquid crystal display (LCD), a light-emitting diode (LED) display, etc., coupled to bus 615 through bus 665 for displaying information to a computer user. An alphanumeric input device 675, including alphanumeric and other keys, may also be coupled to bus 615 through bus 665 for communicating information and command selections to processor 610. An additional user input device is cursor control device 680, such as a touchpad, mouse, a trackball, stylus, or cursor direction keys coupled to bus 615 through bus 665 for communicating direction information and command selections to processor 610, and for controlling cursor movement on display device 670.

Another device, which may optionally be coupled to computer system 600, is a communication device 690 for accessing other nodes of a distributed system via a network. The communication device 690 may include any of a number of commercially available networking peripheral devices such as those used for coupling to an Ethernet, token ring, Internet, or wide area network. The communication device 690 may further be a null-modem connection, or any other mechanism that provides connectivity between the computer system 600 and the outside world. Note that any or all of the components of this system illustrated in FIG. 6 and associated hardware may be used in various embodiments of the present invention.

It will be appreciated by those of ordinary skill in the art that any configuration of the system may be used for various purposes according to the particular implementation. The control logic or software implementing the present invention can be stored in main memory 650, mass storage device 625, or other storage medium locally or remotely accessible to processor 610.

It will be apparent to those of ordinary skill in the art that the system, method, and process described herein can be implemented as software stored in main memory 650 or read only memory 620 and executed by processor 610. This control logic or software may also be resident on an article of manufacture comprising a computer readable medium having computer readable program code embodied therein and being readable by the mass storage device 625 and for causing the processor 610 to operate in accordance with the methods and teachings herein.

The present invention may also be embodied in a handheld or portable device containing a subset of the computer hardware components described above. For example, the handheld device may be configured to contain only the bus 615, the processor 610, and memory 650 and/or 625. The handheld device may also be configured to include a set of buttons or input signaling components with which a user may select from a set of available options. The handheld device may also be configured to include an output apparatus such as a liquid crystal display (LCD) or display element matrix for displaying information to a user of the handheld device. Conventional methods may be used to implement such a handheld device. The implementation of the present invention for such a device would be apparent to one of ordinary skill in the art given the disclosure of the present invention as provided herein.

The present invention may also be embodied in a special purpose appliance including a subset of the computer hardware components described above. For example, the appliance may include a processor 610, a data storage device 625, a bus 615, and memory 650, and only rudimentary communications mechanisms, such as a small touch-screen that permits the user to communicate in a basic manner with the device. In general, the more special-purpose the device is, the fewer of the elements need be present for the device to function.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

We claim:

1. A computer implemented method, comprising:
receiving, at a job aggregation system, a job title having a plurality of words that make up the job title, the job title received as part of a request of the job aggregation system to perform a service;
translating the plurality of words into standardized terms of the job aggregation system to generate a translated job title;
mapping the translated job title to one of a plurality of normalized occupations of the job aggregation system by a machine learning based classifier of the translated job title, wherein the machine learning based classifier is trained based on user search behavior of users that have searched for jobs at the job aggregation system;
performing the requested service by the job aggregation system using the one of the plurality of normalized occupations; and
wherein the machine learning based classifier is trained based on user search behavior of users that have searched for jobs at the job aggregation system further comprises:
receiving a job search request from a user computer system that includes a user inputted job title;
translating words in the user inputted job title to a job title having one or more standardized terms of the job aggregation system;
tracking a user computer system selection of a search result returned to the user computer system in response to the job search request, wherein the selected search result is associated with a normalized occupation from the plurality of normalized occupations;
building a relationship graph that associates the one or more standardized terms with the normalized occupation associated with the selected search result; and
performing a machine learning analysis on the relationship graph to train the machine learning based classifier to provide a relationship strength between each standardized term of the standardized terms of the job aggregation system and each normalized occupation from the plurality of normalized occupations of the job aggregation system based at least in part on the association between the one or more standardized terms and the normalized occupation associated with the selected search result.

2. The method of claim 1, wherein the translating further comprises:
translating the plurality of words into the standardized terms of the job aggregation system based on one or more static listings that map each of the plurality of words to a corresponding standardized term of the job aggregation system; and
stripping the translated job title into a plurality of component parts of the translated job title.

3. The method of claim 2, wherein the plurality of component parts comprise an occupation component part, a seniority component part, and a modifier component part, and wherein the one or more static listings comprise a first static listing mapping words to standardized occupation terms, a second static listing mapping words to standardized seniority terms, and a third static listing mapping words to standardized modifier terms.

4. The method of claim 2, wherein stripping further comprises:
removing one or more of punctuation, adverbs, prepositions, and capitalization from the translated job title.

5. The method of claim 1, wherein mapping the translated job title to one of a plurality of normalized occupations comprises:
utilizing the machine learning based classifier to determine a relationship strength between each standardized term of the translated job title with of the plurality of normalized occupations;
generating a sum of relationship strengths for each of the plurality of normalized occupations;
selecting a normalized occupation from the plurality of normalized occupations of the job aggregation system having a greatest relationship strength sum as a selected normalized occupation; and
mapping the translated job title to the selected normalized occupation, wherein the mapping associates the received job title with the selected normalized occupation.

6. The method of claim 1, wherein a plurality of job search requests are received from a plurality of different user computer systems, and wherein the machine learning analysis is performed on the relationship graph generated from the plurality of tracked selections by the plurality of different user computer systems.

7. The method of claim 1, wherein the plurality of normalized occupations comprise a predetermined set of occupations where each job listing of the job aggregation system can be associated with one of the predetermined set of occupations.

8. The method of claim 1, wherein the service comprises a job search request initiated by a user computer system specifying the received job title, a job upload request initiated by a third party computer system including a job listing having the received job title, or a job upload request initiated by the job aggregation system in response to a crawl of a third party computer system that includes a job listing having the received job title found during the crawl.

9. A non-transitory computer readable storage medium including instructions that, when executed by a processor, cause the processor to perform a method comprising:
   receiving, at a job aggregation system, a job title having a plurality of words that make up the job title, the job title received as part of a request of the job aggregation system to perform a service;
   translating the plurality of words into standardized terms of the job aggregation system to generate a translated job title;
   mapping the translated job title to one of a plurality of normalized occupations of the job aggregation system by a machine learning based classifier of the translated job title, wherein the machine learning based classifier is trained based on user search behavior of users that have searched for jobs at the job aggregation system;
   performing the requested service by the job aggregation system using the one of the plurality of normalized occupations; and
   wherein the machine learning based classifier is trained based on user search behavior of users that have searched for jobs at the job aggregation system further comprises:
   receiving a job search request from a user computer system that includes a user inputted job title;
   translating words in the user inputted job title to a job title having one or more standardized terms of the job aggregation system;
   tracking a user computer system selection of a search result returned to the user computer system in response to the job search request, wherein the selected search result is associated with a normalized occupation from the plurality of normalized occupations;
   building a relationship graph that associates the one or more standardized terms with the normalized occupation associated with the selected search result; and
   performing a machine learning analysis on the relationship graph to train the machine learning based classifier to provide a relationship strength between each standardized term of the standardized terms of the job aggregation system and each normalized occupation from the plurality of normalized occupations of the job aggregation system based at least in part on the association between the one or more standardized terms and the normalized occupation associated with the selected search result.

10. The non-transitory computer readable storage medium of claim 9, wherein the translating further comprises:
   translating the plurality of words into the standardized terms of the job aggregation system based on one or more static listings that map each of the plurality of words to a corresponding standardized term of the job aggregation system; and
   stripping the translated job title into a plurality of component parts of the translated job title.

11. The non-transitory computer readable storage medium of claim 10, wherein the plurality of component parts comprise an occupation component part, a seniority component part, and a modifier component part, and wherein the one or more static listings comprise a first static listing mapping words to standardized occupation terms, a second static listing mapping words to standardized seniority terms, and a third static listing mapping words to standardized modifier terms.

12. The non-transitory computer readable storage medium of claim 10, wherein stripping further comprises:
   removing one or more of punctuation, adverbs, prepositions, and capitalization from the translated job title.

13. The non-transitory computer readable storage medium of claim 9, wherein mapping the translated job title to one of a plurality of normalized occupations comprises:
   utilizing the machine learning based classifier to determine a relationship strength between each standardized term of the translated job title with of the plurality of normalized occupations;
   generating a sum of relationship strengths for each of the plurality of normalized occupations;
   selecting a normalized occupation from the plurality of normalized occupations of the job aggregation system having a greatest relationship strength sum as a selected normalized occupation; and
   mapping the translated job title to the selected normalized occupation, wherein the mapping associates the received job title with the selected normalized occupation.

14. The non-transitory computer readable storage medium of claim 9, wherein a plurality of job search requests are received from a plurality of different user computer systems, and wherein the machine learning analysis is performed on the relationship graph generated from the plurality of tracked selections by the plurality of different user computer systems.

15. The non-transitory computer readable storage medium of claim 9, wherein the plurality of normalized occupations comprise a predetermined set of occupations where each job listing of the job aggregation system can be associated with one of the predetermined set of occupations.

16. The non-transitory computer readable storage medium of claim 9, wherein the service comprises a job search request initiated by a user computer system specifying the received job title, a job upload request initiated by a third party computer system including a job listing having the received job title, or a job upload request initiated by the job aggregation system in response to a crawl of a third party computer system that includes a job listing having the received job title found during the crawl.

17. A system, comprising:
   a memory; and
   a processor coupled with the memory, the processor configured to:
   receive a job title having a plurality of words that make up the job title, the job title received as part of a request of a job aggregation system to perform a service,
   translate the plurality of words into standardized terms of the job aggregation system to generate a translated job title, map the translated job title to one of a plurality of normalized occupations of the job aggregation system by a machine learning based classifier of the translated job title, wherein the machine learning based classifier is trained based on user search behavior of users that have searched for jobs at the job aggregation system, perform the requested service by the job aggregation system using the one of the plurality of normalized occupations, and wherein the machine learning based classifier is trained based on user search behavior of users that have searched for jobs at the job aggregation system further comprising the processor configured to:

receive a job search request from a user computer system that includes a user inputted job title, translate words in the user inputted job title to a job title having one or more standardized terms of the job aggregation system, track a user computer system selection of a search result returned to the user computer system in response to the job search request, wherein the selected search result is associated with a normalized occupation from the plurality of normalized occupations, build a relationship graph that associates the one or more standardized terms with the normalized occupation associated with the selected search result, and perform a machine learning analysis on the relationship graph to train the machine learning based classifier to provide a relationship strength between each standardized term of the standardized terms of the job aggregation system and each normalized occupation from the plurality of normalized occupations of the job aggregation system based at least in part on the association between the one or more standardized terms and the normalized occupation associated with the selected search result.

18. The system of claim 17, further comprising the processor configured to:

translate the plurality of words into the standardized terms of the job aggregation system based on one or more static listings that map each of the plurality of words to a corresponding standardized term of the job aggregation system; and strip the translated job title into a plurality of component parts of the translated job title.

* * * * *